May 3, 1927.
G. G. HEARN
1,626,822
PROTECTIVE DEVICE FOR AUTOMOBILE FUEL TANKS
Filed May 20, 1925
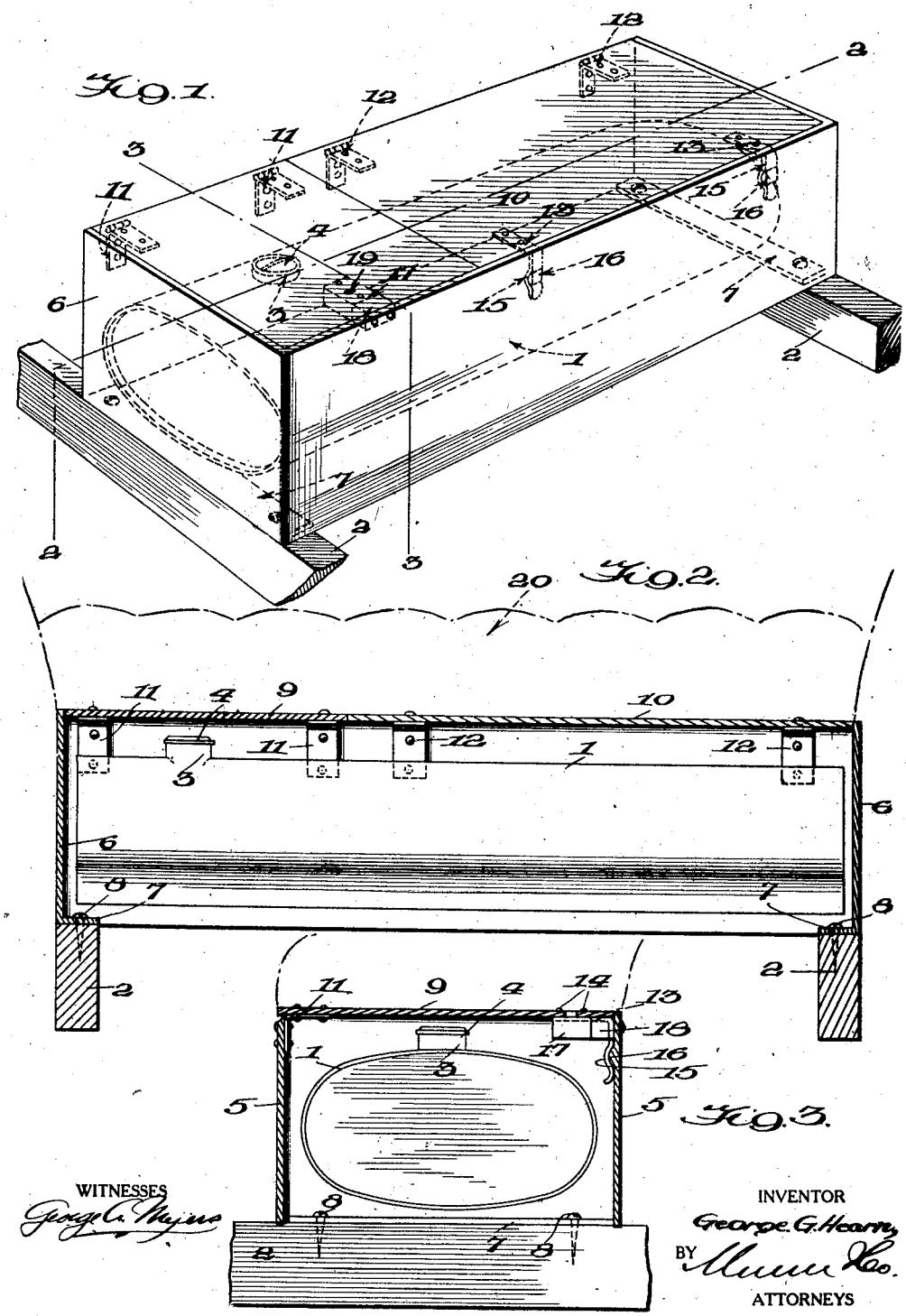

Patented May 3, 1927.

1,626,822

UNITED STATES PATENT OFFICE.

GEORGE GLENN HEARN, OF ST. PETERSBURG, FLORIDA.

PROTECTIVE DEVICE FOR AUTOMOBILE FUEL TANKS.

Application filed May 20, 1925. Serial No. 31,729.

My invention is a protective device for automobile fuel tanks, and it consists in the combinations, constructions and arrangements herein described and claimed.

An object of the invention is the provision of a device which is adapted to be associated with the fuel tank of an automobile, and which affords facilities for preventing access to the filler opening or inlet of the fuel tank by unauthorized persons.

A further object of the invention is the provision of a protective device of the character described which in addition to preventing access to the filler opening of the fuel tank by unauthorized persons, serves to brace and aids in supporting adjacent parts of the automobile to which the device is applied.

Other objects and advantages of the invention will be apparent from the following description, considered in conjunction with the accompanying drawings, in which:

Figure 1 is a perspective view showing a practical embodiment of the invention in applied position on a fuel tank supporting structure, Figure 2 is a vertical section substantially along the line 2—2 of Figure 1, with the tank shown in elevation and with certain parts which are adjacent to the tank indicated by dot and dash lines, and Figure 3 is a transverse vertical section substantially along the line 3—3 of Figure 1 with the tank shown in end elevation and with parts which are adjacent to the tank shown in dot and dash lines.

In the drawings, a fuel tank 1 is supported adjacent to its opposite ends upon a pair of spaced supporting members 2 which in actual practice will be the side members of the frame of an automobile. The tank 1 is provided with a filler opening or inlet 3 in its upper part adjacent one end thereof, this filler opening normally being closed by a cap 4 or in any other suitable known manner.

A device embodying the invention comprises a housing having a hollow body consisting of a pair of vertical side members 5 and vertical end members 6 joined to each other integrally or in any other suitable known manner, and made of a relatively strong material which preferably, although not necessarily, is metal. The body of the housing thus will be open at both its upper and lower ends and is adapted to fit over the tank 1 and to rest at its lower end on the supporting members 2 so that inturned attaching flanges 7 at the lower edges of the end members 6 of the body will rest flatwise upon the supporting members 2 and are adapted to be secured rigidly to the supporting members 2 by screws 8 or like fastening devices.

The housing also comprises a cover for closing the upper end of the body of the housing. This cover comprises two sections 9 and 10 respectively which are separate from each other and are adapted when placed in endwise juxtaposed relation to completely cover the upper end of the body of the housing. The section 9 is disposed on the body of the housing above the filler opening 3 and is attached at one edge to the body of the housing by hinges 11 which are disposed within the housing when the cover section 9 is closed. The cover section 10 likewise is attached at one edge to the body of the housing by hinges 12 which likewise are disposed within the housing when the cover section 10 is closed. The section 10 is releasably held in closed position by spring friction latches 13, each of which comprises an attaching portion secured to the underside of the section 10 adjacent to the free edge thereof, as at 14, and a pendant latching portion which is curved between its ends, as at 15, to provide a concavely curved socket for engaging with a projection 16 on the inner face of the adjacent portion of the body of the housing.

The section 9 is locked in closed position by means of a lock 17 which is secured to the underside of the section 9 adjacent to the free edge of the latter, and in the required position to permit the lock bolt, not shown, to engage with a keeper 18 on the inner face of the adjacent portion of the body of the housing when the section 9 is closed. The lock 17 and the keeper 18 may be of any suitable known type of construction which will afford facilities for holding the cover section 9 closed against a considerable stress. For example the lock 17 may be any one of a plurality of well known permutation locks, or it may be a lock adapted to be actuated by a key, an opening as at 19 being provided in the cover section 9 to permit insertion of a key from the outer side of the housing to operate the lock.

From the foregoing description of the various parts of the device, the operation thereof may be readily understood. Access to the filler opening 3 to permit filling of the tank 1 cannot be had until the cover section 9 has been raised. It is manifest that the housing cannot be displaced from position to practically encompass the tank 1 unless both the cover sections 9 and 10 have been raised or until the housing is displaced by violence with the cover sections closed. The parts of the device which secure the housing to the supporting members 2 are relatively strong and any person seeking access to the filler opening of the tank would have considerable difficulty in displacing the housing even with the use of ordinary tools while the cover sections of the housing are closed, and would have equal difficulty in opening the cover section 9 without operating the lock. Therefore, the theft of an automobile can be practically prevented by locking the cover section 9 in closed position so that an unauthorized person cannot have access to the filler opening of the fuel tank. Moreover, use of an automobile equipped with the invention can be limited to that which is possible as a result of the consumption of a given quantity of fuel in the fuel tank.

The device therefore is particularly well adapted for use in connection with the fuel tanks of automobiles which are rented to persons who will operate the automobile themselves, since only sufficient fuel may be placed in the tank at the time an automobile has been rented to permit use of the automobile according to the terms of the agreement by the renter of the automobile with the owner thereof.

In addition to performing the function just mentioned, the housing will serve to brace the seat 20 and other parts of an automobile which may be superimposed thereon when the housing is in applied position on the tank and supporting structure of the automobile.

Obviously, the invention is susceptible of embodiment in forms other than that which is illustrated in the accompanying drawings, and I therefore consider as my own all such modifications and adaptations thereof as fairly fall within the scope of the appended claim.

I claim:—

A protective device for fuel tanks of an automobile comprising a hollow body open at its upper and lower ends and adapted to fit over the fuel tank and to rest at its lower end on fixed supporting means of the automobile, said body having inturned attaching members at its lower end resting upon said supporting means and adapted to be secured thereto, a cover for closing the upper end of said body, said cover presenting a pair of complementary sections, hinges attaching said sections of the cover to said body, said hinges being located within the body when the cover sections are closed, one of said cover sections overlying the filler opening of the fuel tank of the automobile, a lock carried by said one cover section for securing said one section to the body when the section is closed, and releasable means for holding the other section of the cover closed.

GEORGE GLENN HEARN.